US011645055B2

(12) United States Patent
Kulkarni et al.

(10) Patent No.: US 11,645,055 B2
(45) Date of Patent: May 9, 2023

(54) CUSTOM INTEGRATION FLOW STEP FOR INTEGRATION SERVICE

(71) Applicant: SAP SE, Walldorf (DE)

(72) Inventors: Gopalkrishna Kulkarni, Bangalore (IN); Shankara Prasad K, Puttur Karnataka (IN); Sumanth Kempegowda, Mandya (IN); Parthasarathy Menon, Bengaluru Karnataka (IN)

(73) Assignee: SAP SE, Walldorf (DE)

( * ) Notice: Subject to any disclaimer, the term of this patent is extended or adjusted under 35 U.S.C. 154(b) by 4 days.

(21) Appl. No.: 17/243,825

(22) Filed: Apr. 29, 2021

(65) Prior Publication Data

US 2022/0350578 A1 Nov. 3, 2022

(51) Int. Cl.
- *G06F 8/41* (2018.01)
- *G06F 9/54* (2006.01)
- *G06F 8/77* (2018.01)

(52) U.S. Cl.
CPC .............. *G06F 8/433* (2013.01); *G06F 8/77* (2013.01); *G06F 9/541* (2013.01)

(58) Field of Classification Search
CPC ............ G06F 8/433; G06F 8/77; G06F 9/541
See application file for complete search history.

(56) References Cited

U.S. PATENT DOCUMENTS

| | | | | |
|---|---|---|---|---|
| 10,048,830 B2 * | 8/2018 | Jose | ........................... | G06F 8/34 |
| 10,216,491 B2 * | 2/2019 | Gravenites | .............. | G06F 16/23 |
| 11,146,658 B2 * | 10/2021 | Nikain | ................ | H04L 41/0806 |
| 2017/0160880 A1 * | 6/2017 | Jose | ........................ | G06F 9/5072 |
| 2018/0081643 A1 * | 3/2018 | Gravenites | ................ | G06F 8/71 |
| 2019/0102157 A1 * | 4/2019 | Caldato | .................... | G06F 9/505 |
| 2020/0052982 A1 * | 2/2020 | Nainar | ................ | G06F 9/44521 |
| 2020/0167267 A1 * | 5/2020 | Liu | ........................ | H04L 67/34 |

(Continued)

OTHER PUBLICATIONS

Apel, Sebastian, Florian Hertrampf, and Steffen Spathe. "Microservice architecture within in-house infrastructures for enterprise integration and measurement: an experience report." Innovations for Community Services: 18th International Conference, I4CS 2018, Žilina, Slovakia, Jun. 18-20, 2018. (Year: 2018).*

(Continued)

*Primary Examiner* — Matthew J Brophy
(74) *Attorney, Agent, or Firm* — Buckley, Maschoff & Talwalkar LLC

(57) ABSTRACT

According to some embodiments, methods and systems may be associated with a cloud computing environment having an integration service (e.g., associated with a Software-as-a-Service or a Platform-as-a-Service). A design micro service may have a User Interface ("UI") framework and UI components in a domain specific language for an integration developer. A custom flow step development kit may receive, from the integration developer via a browser-based graphical UI, information to build logic for a custom flow step associated with a microservice-based integration service. In some embodiments, a new integration component is embedded into an existing set of components for a tenant, and the new custom flow step is deployed in, and re-usable by, other integration services (e.g., via a marketplace).

18 Claims, 14 Drawing Sheets

(56) References Cited

U.S. PATENT DOCUMENTS

| | | | | |
|---|---|---|---|---|
| 2020/0364953 A1* | 11/2020 | Simoudis | ............... | G06N 5/022 |
| 2020/0396140 A1* | 12/2020 | Bhatia | ................ | H04L 41/5045 |
| 2021/0034338 A1* | 2/2021 | Galchenko | ....... | G06Q 10/06316 |
| 2021/0037114 A1* | 2/2021 | Nikain | ................... | H04L 67/34 |
| 2021/0067431 A1* | 3/2021 | Bonas | .................... | H04L 43/08 |
| 2021/0184951 A1* | 6/2021 | Bonas | .................... | H04L 43/08 |
| 2021/0218622 A1* | 7/2021 | Kulkarni | ................ | H04L 67/51 |
| 2022/0027192 A1* | 1/2022 | Nikain | ................. | G06F 9/4843 |

OTHER PUBLICATIONS

Bhadoria, Robin Singh, Narendra S. Chaudhari, and Geetam Singh Tomar. "The Performance Metric for Enterprise Service Bus (ESB) in SOA system: Theoretical underpinnings and empirical illustrations for information processing." Information Systems 65 (2017): 158-171. (Year: 2017).*

Indrasiri, K., Siriwardena, P. (2018). Integrating Microservices. In: Microservices for the Enterprise. Apress, Berkeley, CA (Year: 2018).*

Yu, Yale, Haydn Silveira, and Max Sundaram. "A microservice based reference architecture model in the context of enterprise architecture." 2016 IEEE Advanced Information Management, Communicates, Electronic and Automation Control Conference (IMCEC). IEEE, 2016. (Year: 2016).*

* cited by examiner

ADKFlowStepProcessor.java

```
    this.endpoint = endpoint;
}

@Override
protected void doStart() throws Exception {
    super.doStart();
} public void process(final Exchange exchange) throws Exception {
    String input = exchange.getIN().getBody(String.class);

String greetingMessage = endpoint.getGreetingsMessage();
    If(greetingMessage == null || greetingMessage.isEmpty()) {
        greetingMessage = "Hello!";
    }

String messageInUpperCase = greetingMessage.toUpperCase();
    If (input != null) {
        LOG.debug(input);
        messageInUpperCase = input + " : " + messageInUpperCase;
    }
    Exchange.getIn().setBody(messageInUpperCase);

}
```

910
| build: StringFormatter Global |
| generate: StringFormatter Global |
| deploy: StringFormatter Global |

CUSTOM INTEGRATION FLOW STEP FOR INTEGRATION SERVICE

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support the exchange of information between multiple applications via messages. For example, FIG. 1 is a high-level block diagram associated with a cloud-based computing system 100. The system may use messages to exchange information between applications, such as an AMAZON® AWS filestore 110, SUCCESSFACTORS® 120, GOOGLE® drive 130, SALESFORCE® 140, etc. In this case, the messages from one application may need to be re-formatted, validated, and/or otherwise processed (e.g., converting dollars into euros) by a middle layer integration service 150 before being sent to another application. In a GUI-based integration service 150, such as the SAP® Cloud Platform, an integration developer can drag-and-drop integration components. However, the integration developer often needs to add custom logic to the message processing. Adding such logic, however, can be a time-consuming and error prone task—especially when there are a substantial number of message types, applications, etc.

It would therefore be desirable to provide a custom integration flow step for an integration service in a cloud computing environment in a secure, automatic, and efficient manner.

SUMMARY

According to some embodiments, methods and systems may be associated with a cloud computing environment having an integration service (e.g., associated with a Software-as-a-Service or a Platform-as-a-Service). A design micro service may have a User Interface ("UI") framework and UI components in a domain specific language for an integration developer. A custom flow step development kit may receive, from the integration developer via a browser-based graphical UI, information to build logic for a custom flow step associated with a microservice-based integration service. In some embodiments, a new integration component is embedded into an existing set of components for a tenant, and the new custom flow step is deployed in, and re-usable by, other integration services (e.g., via a marketplace).

Some embodiments comprise: means for determining that an integration developer wants to create a new custom flow step component via an adapter development framework; means for receiving, from the integration developer, a component name for the custom flow step component via a browser-based development studio; means for receiving, from the integration developer, custom code that adheres to an Enterprise Service Bus ("ESB") to define business logic; means for building the new custom flow step component in accordance with the business logic; and means for deploying an ESB component to runtime and a UI component to design time in connection with the new custom flow step component.

Some technical advantages of some embodiments disclosed herein are improved systems and methods to provide a custom integration flow step for an integration service in a cloud computing environment in a secure, automatic, and efficient manner.

BRIEF DESCRIPTION OF THE DRAWINGS

FIG. 9 shows a custom flow deployment in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a GUI-based integration service, such as the SAP® Cloud Platform, an integration developer drags-and-drops integration components. Moreover, according to some embodiments the integration developer may add custom logic to message processing via a custom flow step approach. In this approach, the developer may create his or her own custom flow step "on the fly." In addition, the custom flows steps may be shared and/or published (e.g., in a marketplace) to be consumed by other users. According to some embodiments, custom code logic written by an integration flow developer will create a new flow step option in the GUI. The logic will be embedded as part of a particular integration scenario and is usable only in integration flow. The custom flow step approach may embed a new integration component into the existing set of components for a tenant where this flow step is deployed and easily re-usable in by other integration services (e.g., via a marketplace).

Figure 2:
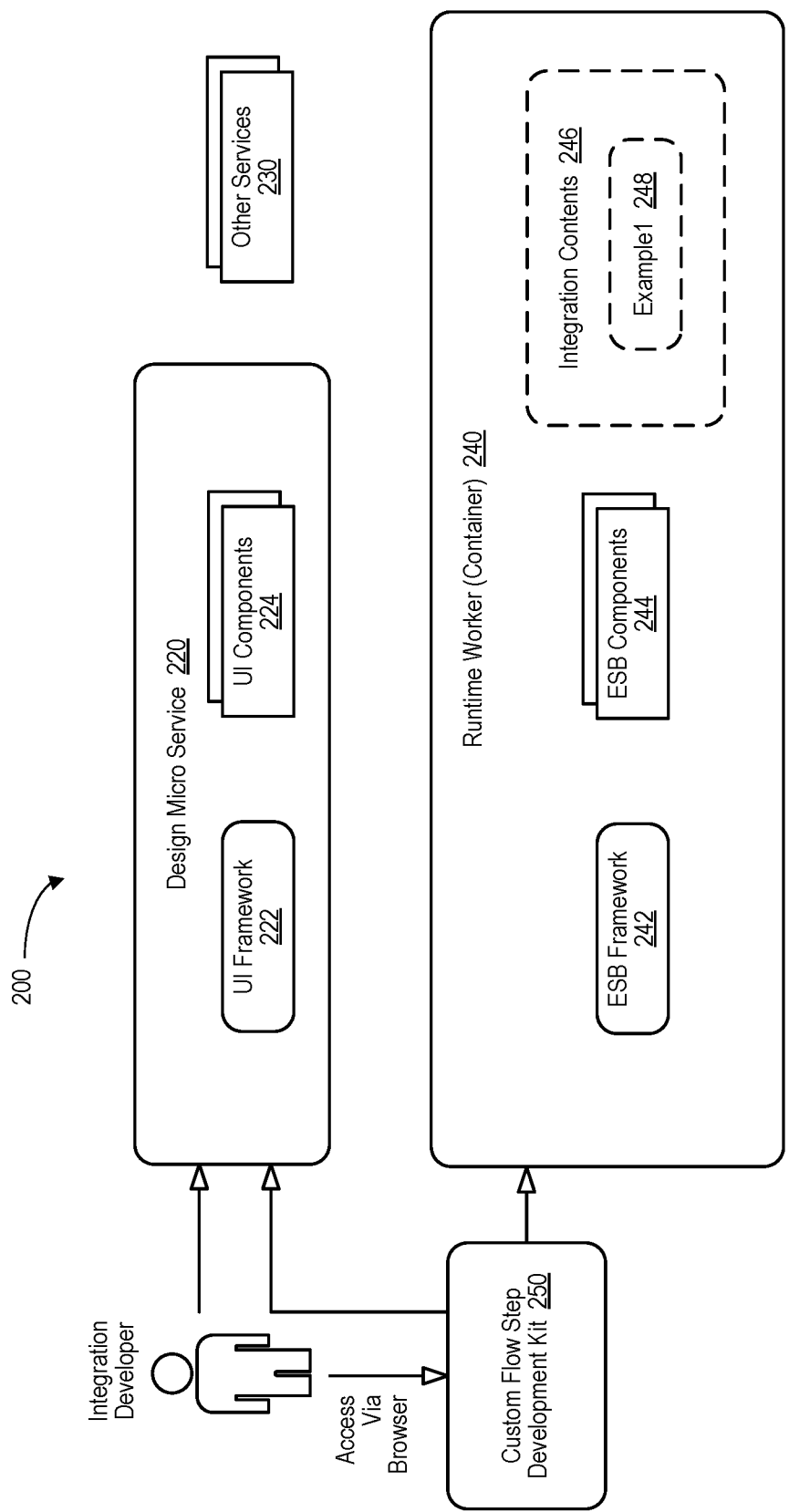
FIG. 2 is an integration service architecture according to some embodiments.

In a cloud computing landscape, stand-alone, individual applications may exchange information via an integration service. FIG. 2 is a high-level block diagram of one example of a system 200 that provides an integration service 200. In particular, an integration developer may access a design micro service 220 that includes a User Interface ("UI") framework 222 and UI components 224 (in addition to accessing other services 230). According to this embodiment, the integration developer may also access (e.g., via a browser) a custom flow set development kit 250 that provides information to the design micro service 220 and a runtime worker 240 (e.g., a container). The runtime worker 240 may include an Enterprise Service Bus ("ESB") framework 242, ESB components 244 and integration contents 246 (e.g., including "Example1" 248). According to some embodiments, a remote operator or administrator device may be used to configure or otherwise adjust the system 200.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The custom flow step development kit 250 may store information into and/or retrieve information from various data stores (e.g., a tenant configuration), which may be locally stored or reside remote from the custom flow step development kit 250. Although a single custom flow step development kit 250 is shown in FIG. 2, any number of such devices may be included. Moreover, various devices described herein might be combined according to embodiments of the present invention. For example, in some embodiments, runtime worker 240 and the custom flow step development kit 250 might comprise a single apparatus. The system 200 functions may be performed by a constellation of networked apparatuses, such as in a distributed processing or cloud-based architecture.

The integration developer may access the system 200 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device 290 (e.g., to define how microservices interact) and/or provide or receive automatically generated recommendations or results associated with the system 200.

Figure 3:
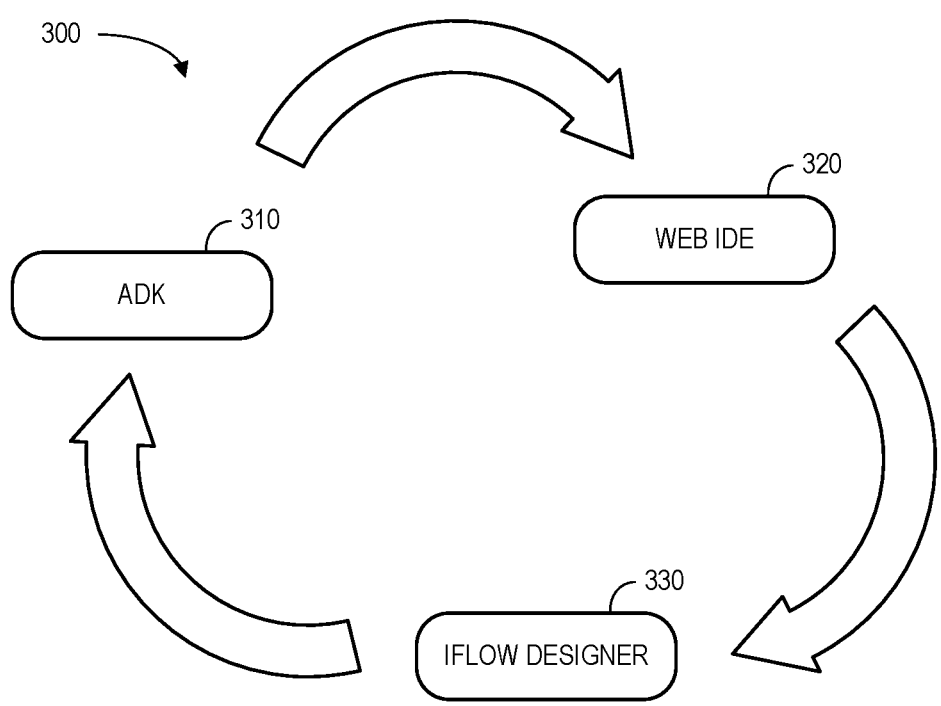
FIG. 3 illustrates the idea of an integration custom flow step in accordance with some embodiments.

In some cases, adapters may act as connectors to external system. A flow step may act as everything else (e.g., a transformer, processor, validator, etc.). As used herein, the phrase "custom flow step" may refer to, for example, a way to meet the specific transformation needs that are not covered by built-in components (validators, converters, etc.). Target users may include an iFlow developer, a custom adapter developer, etc. The custom flow step may extend an Application Development Kit ("ADK") Software Development Kit ("SDK"), provide web-based development, and/or add a dedicated section (e.g., palette) in an iFlow designer. For example, FIG. 3 illustrates 300 the idea of an integration custom flow step in accordance with some embodiments. The ADK 310 may be used to create a web Integrated Development Environment ("IDE") 320 that is used by an iFlow designer 330.

Referring again to FIG. 2, the design micro service 220 may provide for UI modeling. The UI framework 222 consists of the UI components 224 represented in some Domain Specific Language ("DSL"), such as Extensible Markup Language ("XML"). For each UI component 224, a matching runtime ESB component 244 exists. Some embodiments described herein provide the development kit 250 that creates the UI component 224 and the runtime ESB component 244 "on the fly" and helps it be deployed (e.g., via a multi-user marketplace).

Consider, for example, an SAP® Cloud Platform Integration ("CPI"). The SAP® CPI already provides an adapter development framework that helps create a custom end point component. According to some embodiments, this framework may be enhanced by providing an option to create flow steps components. An integration developer, on the integration tenant GUI, may select a "+" sign or other new button to create a new flow step, e.g., a flat file to XML converter step. Upon selection, he or she is re-directed to a browser-based development studio and provide the name of the component and other information (e.g., versioning). He or she may write Java code by adhering to the ESB contract interface (a processor). In this class, the developer may write the business logic, such as converting the file to a particular format. The developer may build this content and deploy it. A deploy module may be enhanced to support deployment of the ESB component 244 to the runtime and the UI component 224 to the design time.

After deployment, a user may see the custom flow step in the integration component GUI (e.g., separated in a new group). Since the newly built custom flow step is available in the tenant as deployed, it may be easily consumable by other integration developers (e.g., via a marketplace).

Figure 4:
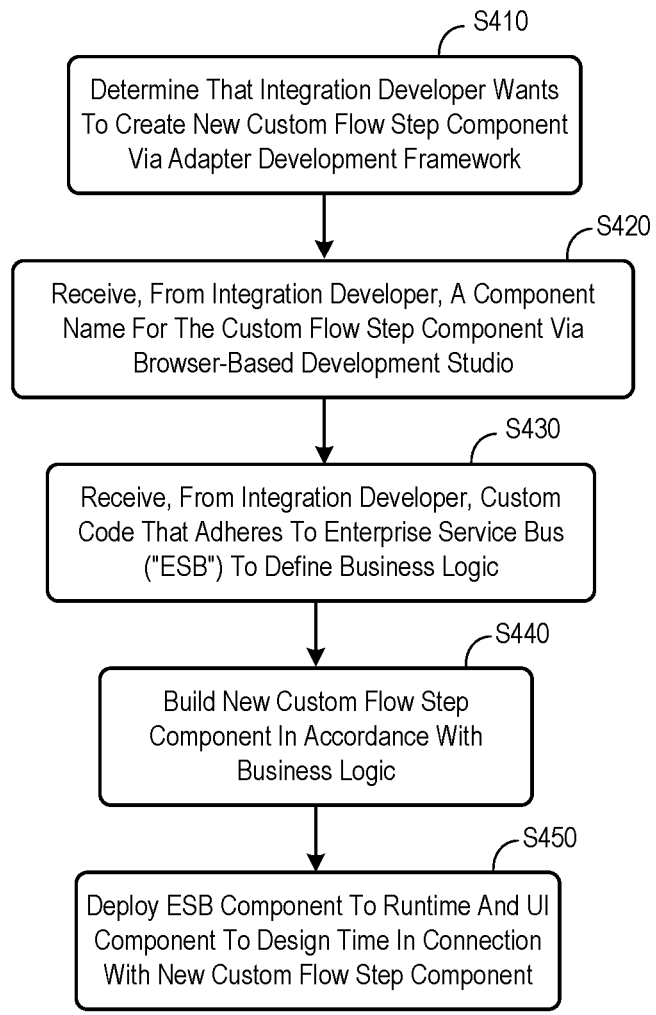
FIG. 4 is a method according to some embodiments.

FIG. 4 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, the system may determine that an integration developer wants to create a new custom flow step component via an adapter development framework. At S420, the system may receive, from the integration developer, a component name for the custom flow step component via a browser-based development studio. At S430, the system may receive, from the integration developer, custom code that adheres to an Enterprise Service Bus ("ESB") to define business logic. At S440, the system may build the new custom flow step component in accordance with the business logic. At S450, the system may deploy an ESB component to runtime and a UI component to design time in connection with the new custom flow step component.

Figure 5:
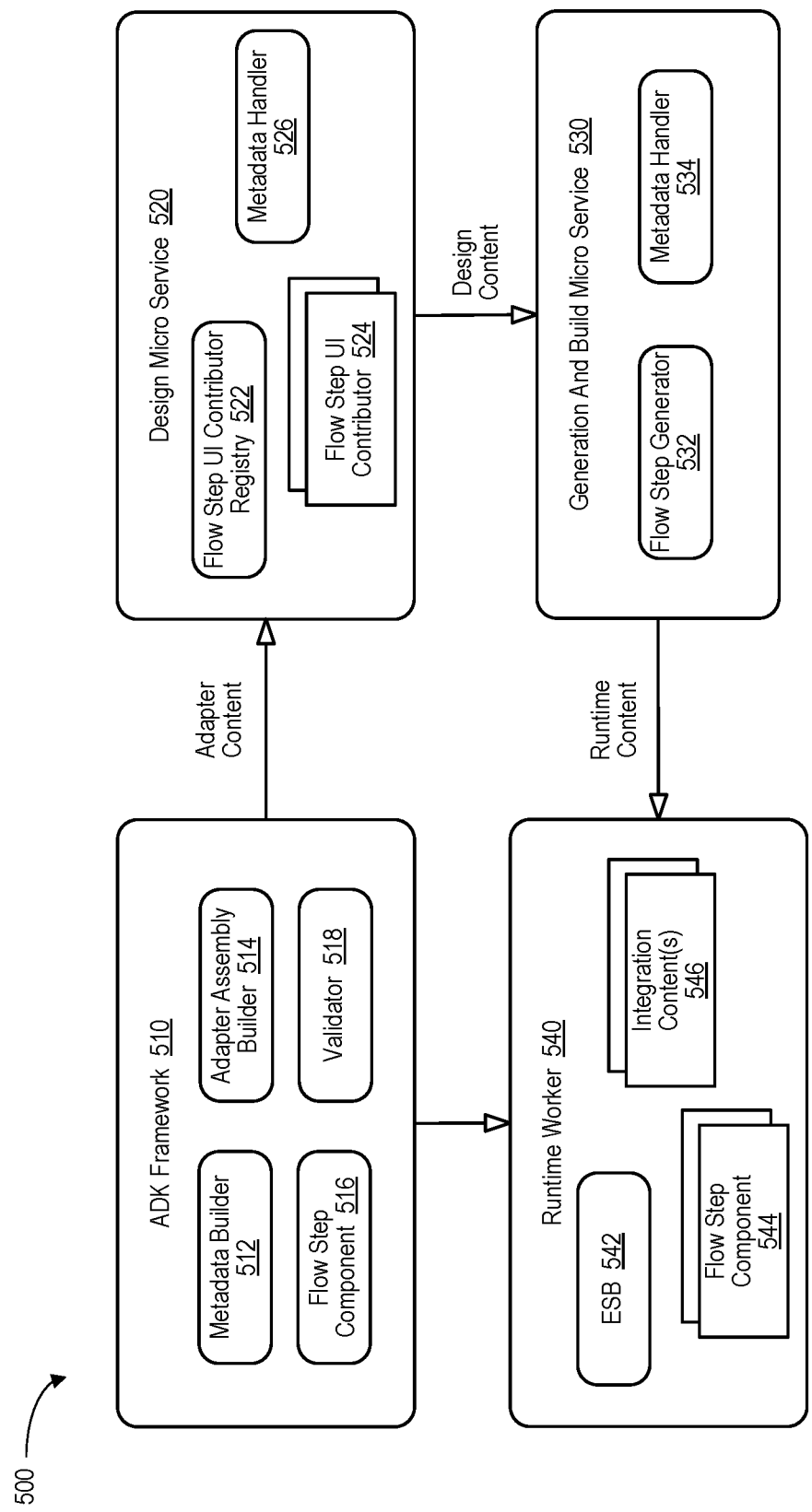
FIG. 5 is another example of an integration service system in accordance with some embodiments.

FIG. 5 is another example of an integration service system 500 in accordance with some embodiments. In this system 500, an ADK framework 510 provides information to a runtime worker 540 and design micro service 520 (e.g., adapter content). The ADK framework 510 includes a metadata builder 512, an adapter assembly builder, a flow step component 516, and a validator 518. The design micro service 520 includes a flow step UI contributor registry 522, flow step UI contributors 524, and a metadata handler 526. The design micro service 520 may, for example, provide design content to a generation and build micro service 530 that includes a flow step generator 532 and a metadata handler 534. The generation and build micro service 530 may then provide runtime content to the runtime worker 540 that includes an ESB 542 (e.g., Apache Camel), integration contents 546, flow step components 544, etc.

It is common that in an integration service offering (such as SAP® CPI), the micro services are separated by the concerns they support. Since the service is GUI-based, a user accesses a web-based tool to build the integration content 546. This may be supported by, for example, the design micro service 520. A developer who wants to build a custom flow step 516 (integration component) can use the ADK framework 510 and get a simple flow step component class (Java class). In this class, a single contract (method) is exposed to write the flow step logic. The user configuration requirements can be met using the metadata DSL (XML); i.e., in the XML one can define the text fields and label field and like UI. According to some embodiments, an existing ADK framework 510 is enhanced to support the flow step-based metadata and component creation. If there is no ADK framework 510 available, one can be built based on the components mentioned above.

After building the custom flow step component 516, a user can directly deploy it to the runtime worker 540 or to the design micro service 520 from which it can be consumed by an integration scenario developer. The design micro service 520 may have two types of content: (1) custom flow step component content, and (2) integration scenario content. In the design micro service 520, embodiments may add a flow step contributor 524 for every flow step component 516. This contributor 524 simply adds to the existing flow step contributor 524 a new one on the fly with a unique identifier of the metadata. The ADK framework 510 may use the validator 518 to reject duplicate flow steps. According to some embodiments, there will be a new group in the UI for custom flow steps.

The design time content may be given to the generation and build micro service 530 which will have a component to generate a specific runtime statement to the custom flow step. This statement may simply be a ESB component routing statement to a component. For example, in Camel:
    <camel:to    uri="flatfileConverter://separator=,&&encoding=utf8>
In the runtime, the user written code may be converted into a ESB 542 component and deployed.

Thus, embodiments may provide an integration development and consume experience. A developer may develop a flow step within integration flow scenario modeling, and a consumer may use the newly built flow step in a seamless experience (it just acts as a pre-built flow step). Moreover, embodiments may provide an ability to share the flow step effectively (without consuming additional resources). Some embodiments may build an integration component which is a code that is built once and re-used like any other component. Some embodiments may offer all the of the monitoring capabilities of integration components (flow steps). That is, a consumer may see the status of the flow step in the monitoring of the integration service (just like any other integration component).

Figure 6:
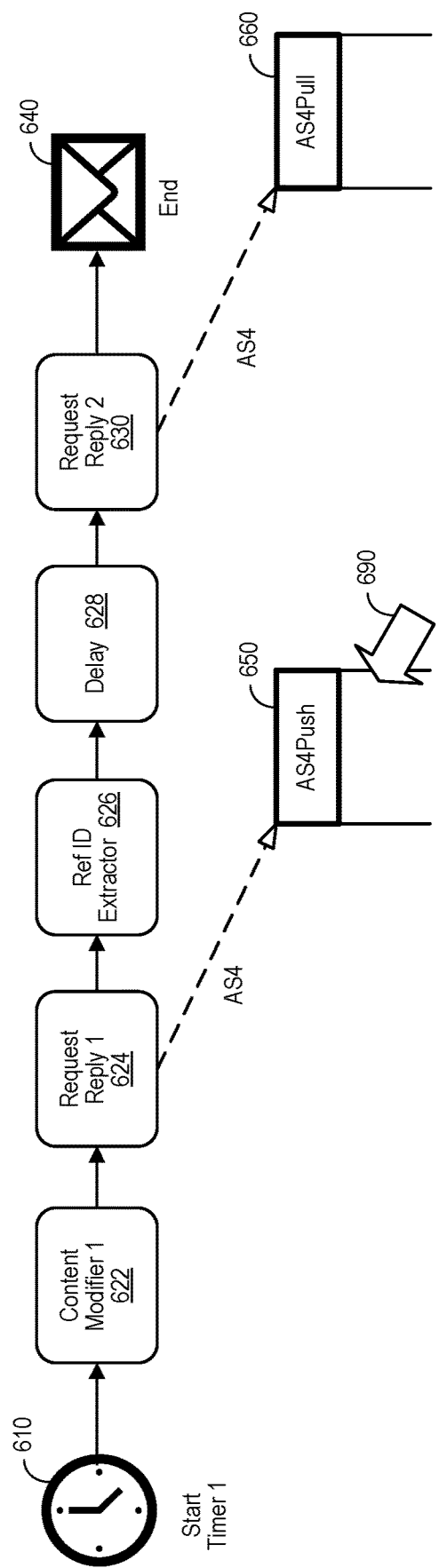
FIG. 6 is an integration process GUI according to some embodiments.
Figure 7:
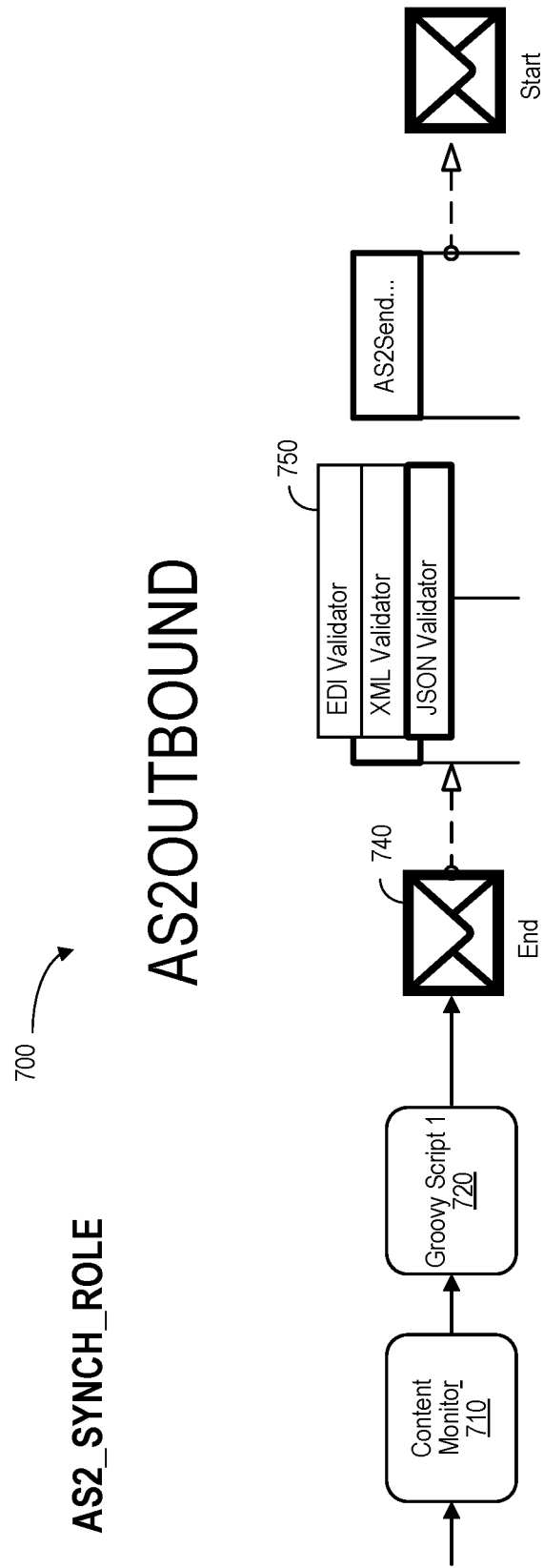
FIG. 7 illustrates validator selection in accordance with some embodiments.

FIG. 6 is an integration process GUI 600 according to some embodiments (e.g., associated with a cloud integration design custom flow step). The GUI 600 supports drag-and-drop operations via a touchscreen or a computer pointer 690. In particular for "AS4_PUSH_PULL," after a timer 1 is started 610, a content modifier 1 is applied 622 and a reply 1 is requested 624. This results in the creation of an AS4Push 650. A reference identifier extractor is applied 626, a delay is performed 682, and a reply 2 is requested 630. The results in creation of an AS4Pull 660. The message processing then ends 640. According to some embodiments, a validator may be selected in connection with a custom flow step. For example, FIG. 7 illustrates 700 validator selection in accordance with some embodiments. In particular for "AS2_SYNCH_ROLE," a content monitor is applied 710 and groovy script 1 is executed 720 before the message processing ends 740. According to this embodiment, one of several validators may be selected: an Electronic Data Interchange ("EDI") API validator, an XML API validator, a JavaScript Object Notation ("JSON") API validator, etc.

Figure 8:
FIG. 8 shows a browser-based implementation of a business application according to some embodiments.

FIG. 8 shows 800 a browser-based implementation of a business application according to some embodiments. In particular, business logic code may be defined including a browser-based application 810 implemented via a business application studio. FIG. 9 shows 900 a custom flow deployment in accordance with some embodiments. In this example, may select a task to run from a list of detected tasks, such as a list 910 including build: StringFormatter Global, generate: StringFormatter Global, deploy: StringFormatter Global, etc.

Figure 10:
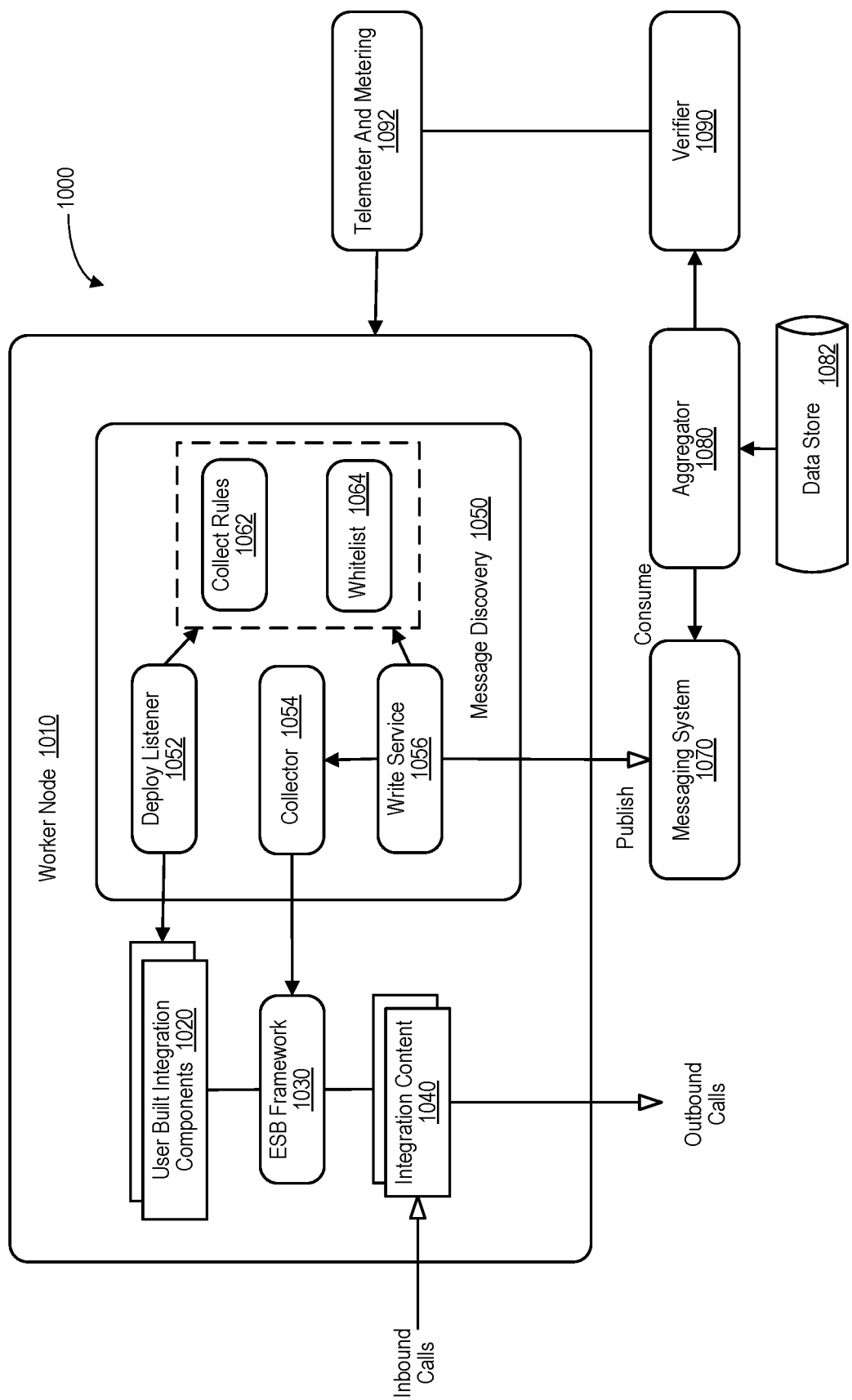
FIG. 10 is an integration system framework according to some embodiments.

FIG. 10 is an integration system framework 1000 according to some embodiments. Note that an integration service may comprise a middle layer component to help systems and/or applications communicate with each other in an efficient way. Moreover, the message flow through the middle layer may be substantial high. In the framework 1000, a worker node 1010 may include integration content 1040 to receive inbound calls and provide outbound calls. The integration content 1040 may be coupled to user build integration components 1020 via an ESB framework 1030. A message discovery 1050 in the worker node 1010 may include deploy a listener 1052, a collector 1054, a write service 1056, collect rules 1062, and a whitelist 1064. The write service 1056 may publish information to a messaging system 1070 which consumes information from an aggregator 1080. The aggregator 1080 might, for example, receive information from a data store 1082 and provide information to telemeter and metering 1092 after being confirmed by a verifier 1090.

Figure 11:
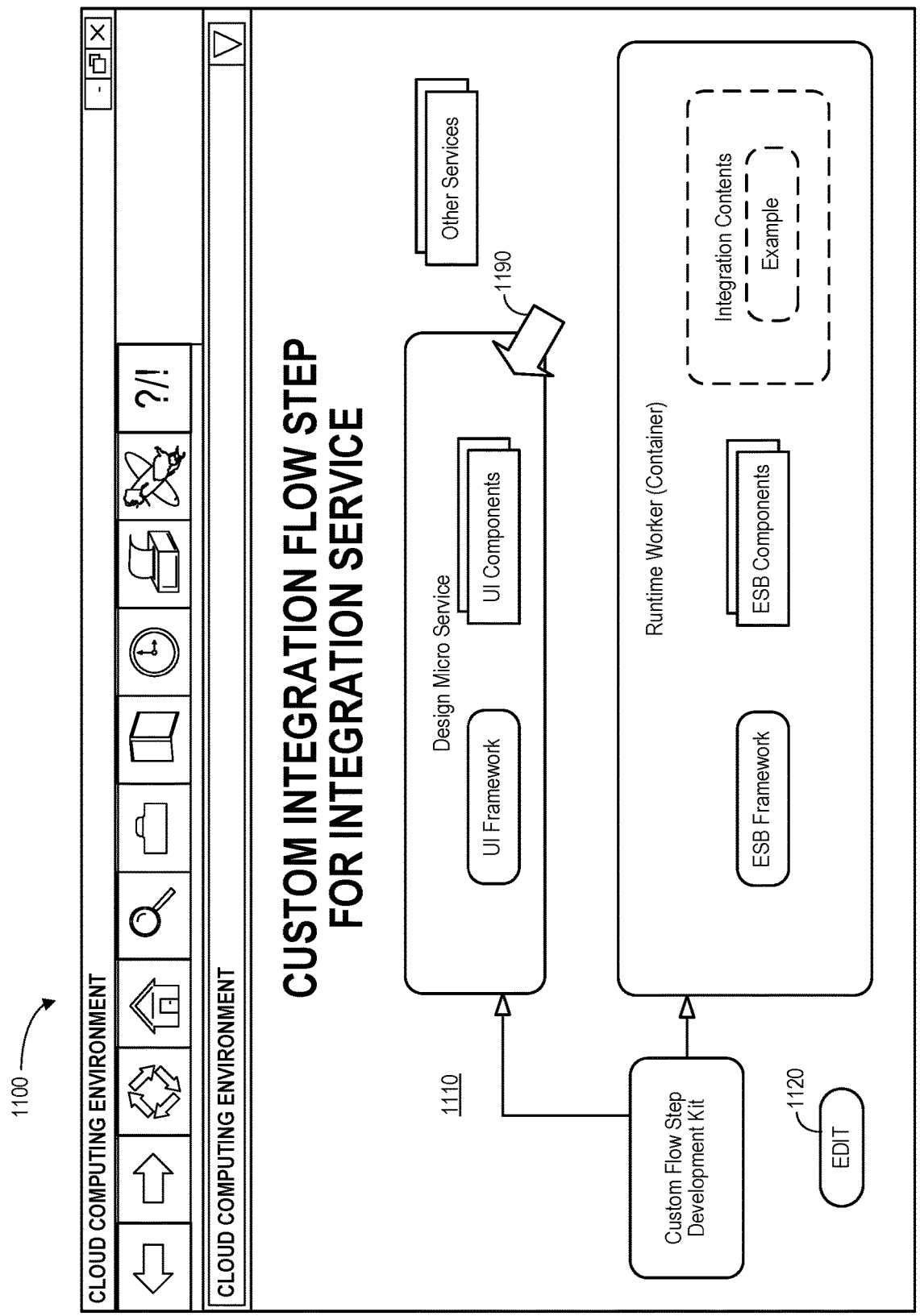
FIG. 11 is a human machine interface display according to some embodiments.

FIG. 11 is a human machine interface display 1100 according to some embodiments. The display 1100 includes a graphical representation 1110 of a custom integration flow step system in accordance with any of the embodiments described herein. Selection of an element on the display 1100 (e.g., via a touchscreen or computer pointer 1190) may result in display of a pop-up window containing more detailed information about that element and/or various options (e.g., couple components, configure interfaces, adjust tenant configuration information, etc.). Selection of an "Edit" icon 1130 may also let an operator or administrator adjust the operation of the system (e.g., to change a validation rule, add a new type of flow step category, etc.).

Thus, embodiments may provide an ability to build a lightweight custom flow step in a microservice-based integration service on the fly. Moreover, a development kit may support a custom flow step offering with a similar experience to inbuilt flow steps. In addition, embodiments may support the re-usability of a custom flow step within the same tenant seamlessly and offer custom flow step (scripting) in a light weight and/or re-usable way (as opposed to a tightly couple script found in an integration scenario).

Figure 1:
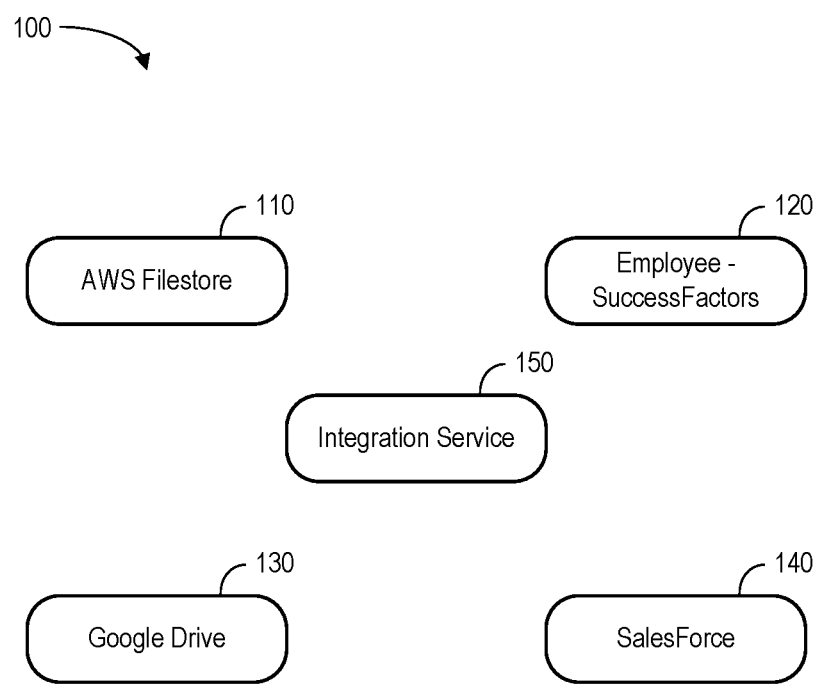
FIG. 1 is a high-level block diagram associated with a cloud-based computing system.
Figure 12:
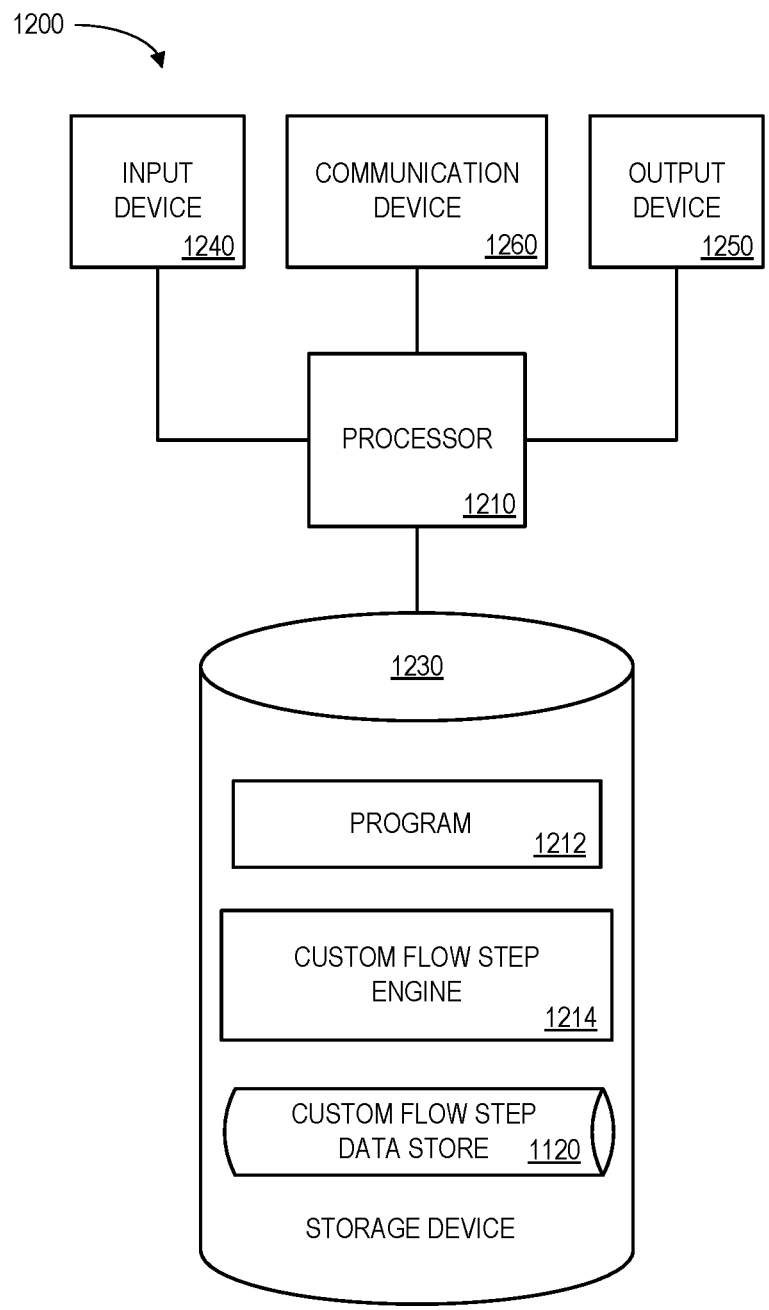
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the systems 120, 400 of FIGS. 1 and 4, respectively (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1260 may be used to communicate, for example, with one or more remote user platforms, administrator platforms, etc. The platform 1200 further includes an input device 1240 (e.g., a computer mouse and/or keyboard to input microservice or custom step information) and/an output device 1250 (e.g., a computer monitor to render a display, transmit recommendations, and/or create reports about integration services, custom flow steps, tenants, users, etc.). According to some embodiments, a mobile device and/or PC may be used to exchange information with the platform 1200.

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or custom flow step engine 1214 for controlling the processor 1210. The processor 1210 performs instructions of the programs 1212, 1214, and thereby operates in accordance with any of the embodiments described herein. For example, the processor 1210 may provide an integration service (e.g., associated with a Software-as-a-Service or a Platform-as-a-Service). The processor 1210 may utilize a UI framework and UI components in a domain specific language for an integration developer. The processor 1210 may also receive, from the integration developer via a browser-based graphical UI, information to build logic for a custom flow step associated with a microservice-based integration service. In some embodiments, a new integration component is embedded into an existing set of components for a tenant, and the new custom flow step is deployed by the processor 12010 in, and is re-usable by, other integration services (e.g., via a marketplace).

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a custom flow step data store 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 is portion of a custom flow step data store in accordance with some embodiments.

Referring to FIG. 13, a table is shown that represents the custom flow step data store 1300 that may be stored at the platform 1200 according to some embodiments. The table may include, for example, entries identifying flow steps that have been created and/or customized for integration services associated with a cloud computing environment. The table may also define fields 1302, 1304, 1306, 1308, 1310 for each of the entries. The fields 1302, 1304, 1306, 1308, 1310 may, according to some embodiments, specify: a custom flow step identifier 1302, a tenant identifier 1304, an integration service identifier 1306, microservices 1308, and custom flow step code 1310. The custom flow step data store 1300 may be created and updated, for example, when new users or tenants are added to a system, new flow steps are added or customized, etc.

The custom flow step identifier 1302 might be a unique alphanumeric label that is associated with a flow step that has been created for an integration service associated with a cloud computing environment. The tenant identifier 1304 may represent an enterprise, group of users, etc. who utilize the cloud computing environment. The integration service identifier 1306 may define an application (e.g., a payroll or human resources application) composed of a number of different microservices 1308 (or, in some embodiments, modules or other types of components). The custom flow step code 1310 might comprise, for example, Java code implementing business logic entered via a browser-based application (such as a business application studio).

Thus, embodiments may provide a custom integration flow step for an integration service in a cloud computing environment in a secure, automatic, and efficient manner. Embodiments may provide an integration development and consume experience. A developer may develop the flow step within the integration flow scenario modeling and for a consumer who uses the newly built flow step the experience may be seamless (e.g., it might just act as a pre-built flow step. Moreover, embodiments may provide an ability to share the flow step effectively (without consuming additional resources). That is, the developer may build an integration component once to be re-used like any other component. In addition, some embodiments may offer the same monitoring capabilities of the integration components for flow steps. For example, consumer might see the status of the flow step in the monitoring of the integration service (just like any other integration component).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
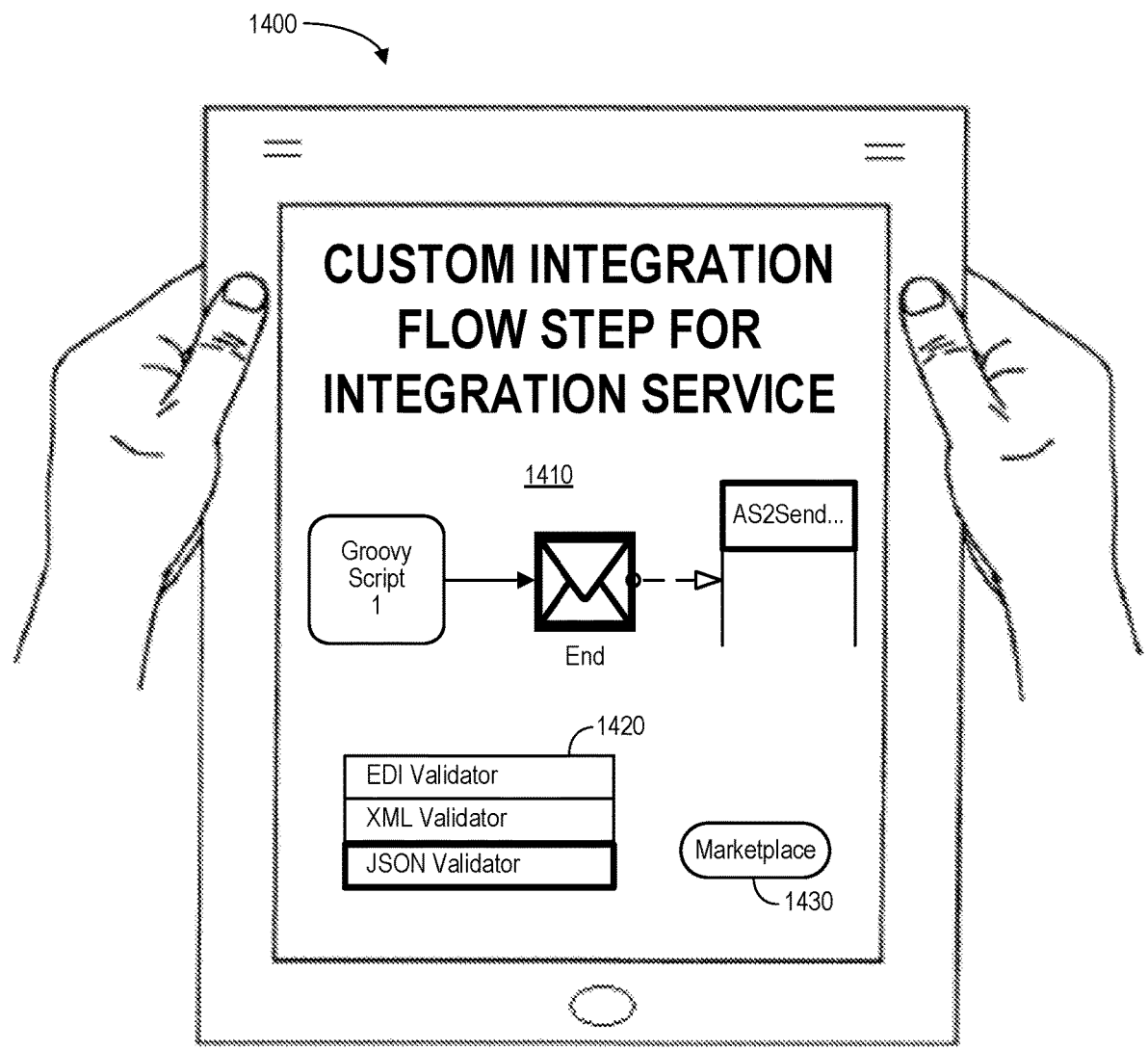
FIG. 14 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. For example, FIG. 14 illustrates a table computer 1400 providing a customer integration flow step for integration service display 1410. The display 1410 might be used, for example, to select an appropriate validator 1420 (e.g., EDI, XML, or JSON). Moreover, the display 1410 might be deployed via a "Marketplace" icon 1430 to be easily and efficiently consumed by other users (e.g., associated with the same tenant).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment having an integration service, comprising:
a design micro service having a User Interface ("UP") framework and UI components in a domain specific language for an integration developer;
a runtime worker container including an Enterprise Service Bus ("ESB") framework, ESB components, and integration content; and
a custom flow step development kit that communicates with the runtime worker container, including:
a computer processor, and
a computer memory storing instructions that when executed by the computer processor custom flow step development kit to:
receive, from the integration developer via a browser-based graphical UI, custom flow step build logic associated with a microservice-based integration service,
automatically create, based on the custom flow step build logic, a new UI component and a new runtime ESB component, and
deploy the new UI component and new runtime ESB component to the design micro service and the runtime worker container.

2. The system of claim 1, wherein the logic is embedded as part of a particular integration scenario and is usable only in an integration flow.

3. The system of claim 1, wherein a new integration component is embedded into an existing set of components for a tenant, and the new custom flow step is deployed in, and re-usable by, other integration services.

4. The system of claim 1, wherein the custom flow step development kit supports a custom flow step interface.

5. The system of claim 1, wherein the integration service is associated with at least one of: (i) a Software-as-a-Service, and (ii) a Platform-as-a-Service.

6. The system of claim 1, wherein the custom flow step development kit is associated with an application development kit.

7. The system of claim 6, wherein the application development kit includes a metadata builder, an adapter assembly builder, and a validator.

8. A non-transitory, computer-readable medium having executable instructions stored therein, the medium comprising:

instructions to determine that an integration developer wants to create a new custom flow step component via an adapter development framework;
instructions to receive, from the integration developer, a component name for the custom flow step component via a browser-based development studio;
instructions to receive, from the integration developer, custom code that adheres to an Enterprise Service Bus ("ESB") to define business logic;
instructions to build the new custom flow step component in accordance with the business logic;
instructions to deploy an ESB component to runtime and a User Interface ("UI") component to design time in connection with the new custom flow step component, wherein a design micro service has the UI component in a domain specific language for the integration developer;
instructions to receive, by a custom flow step development kit from the integration developer, custom flow step component build logic associated with a microservice-based integration service;
instructions to automatically create, based on the custom flow step component build logic, a new UI component and a new runtime ESB component; and
instructions to deploy the new UI component and the new runtime ESB component to the design micro service and a runtime worker container that includes an ESB framework, ESB components, and integration content.

9. The medium of claim 8, further comprising:
instructions to display information about the custom flow step component to another integration developer associated with the tenant; and
instructions to arrange for the other integration developer to consume the custom flow step component.

10. The medium of claim 8, wherein the business logic is embedded as part of a particular integration scenario and is usable only in an integration flow.

11. The medium of claim 8, wherein a new integration component is embedded into an existing set of components for a tenant, and the new custom flow step is deployed in, and re-usable by, other integration services.

12. The medium of claim 8, wherein the integration service is associated with at least one of: (i) a Software-as-a-Service, and (ii) a Platform-as-a-Service.

13. A computer-implemented method associated with a cloud computing environment having an integration service, comprising:
determining that an integration developer wants to create a new custom flow step component via an adapter development framework;
receiving, from the integration developer, a component name for the custom flow step component via a browser-based development studio;
receiving, from the integration developer, custom code that adheres to an Enterprise Service Bus ("ESB") to define business logic;
building the new custom flow step component in accordance with the business logic;
deploying an ESB component to runtime and a User Interface ("UP") component to design time in connection with the new custom flow step component, wherein a design micro service has the UI component in a domain specific language for the integration developer;

receiving, by a custom flow step development kit from the integration developer, custom flow step component build logic associated with a microservice-based integration service; and automatically creating, based on the custom flow step component build logic, a new UI component and a new runtime ESB component; and deploying the new UI component and the new runtime ESB component to the design micro service and a runtime worker container that includes an ESB framework, ESB components, and integration content.

14. The method of claim 13, wherein the integration developer is associated with a tenant of the cloud computing environment and further comprising:

displaying information about the custom flow step component to another integration developer associated with the tenant; and arranging for the other integration developer to consume the custom flow step component.

15. The method of claim 13, wherein the business logic is embedded as part of a particular integration scenario and is usable only in an integration flow.

16. The method of claim 13, wherein a new integration component is embedded into an existing set of components for a tenant, and the new custom flow step is deployed in, and re-usable by, other integration services.

17. The method of claim 13, wherein the integration service is associated with at least one of: (i) a Software-as-a-Service, and (ii) a Platform-as-a-Service.

18. The system of claim 1, further comprising:

an integration system framework middle layer component, to help applications communicate, having a worker node that includes:

worker node integration content to receive inbound calls and provide outbound calls, worker node user build integration components coupled to the worker node integration content via a worker node ESB framework, and worker node message discovery to deploy a listener, implement a collector, and execute a write service that publishes information to a messaging system.

* * * * *